Figure 1:
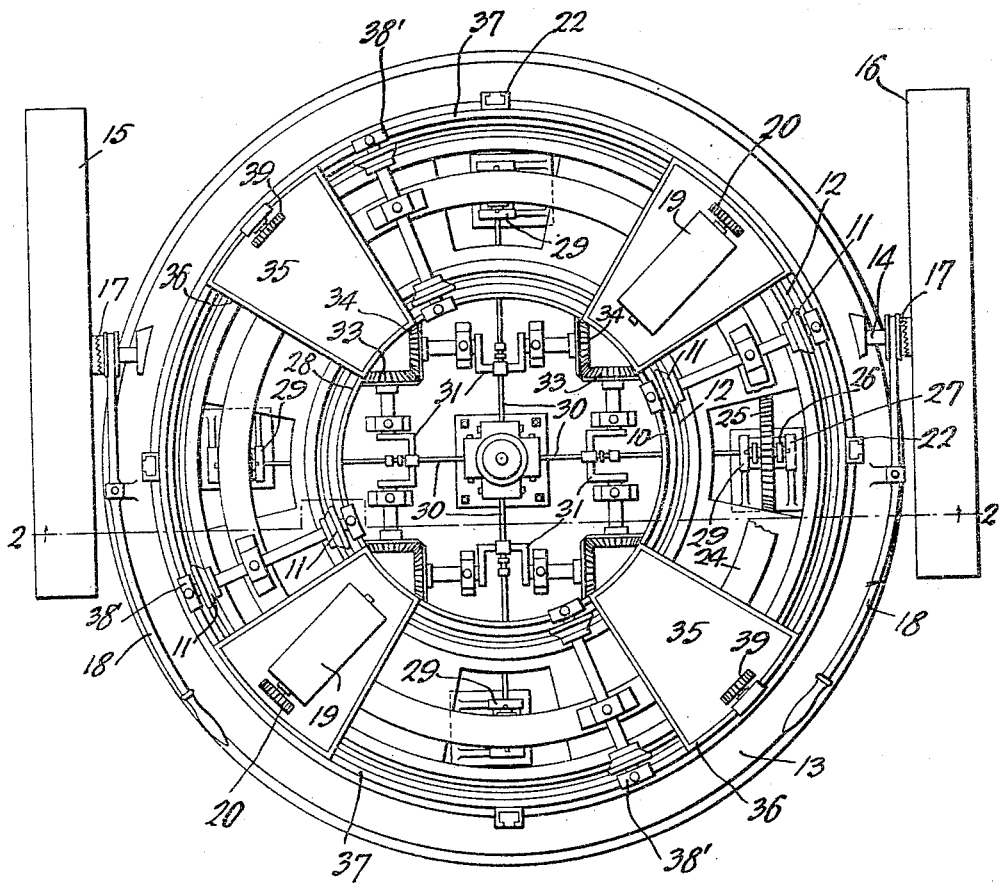

S. DOMINGUEZ.
POWER MULTIPLYING MECHANISM.
APPLICATION FILED APR. 29, 1916.

1,199,165.

Patented Sept. 26, 1916.
2 SHEETS—SHEET 1.

Witnesses

Salvador Dominguez, Inventor
by C. A. Snow & Co.
Attorneys

S. DOMINGUEZ.
POWER MULTIPLYING MECHANISM.
APPLICATION FILED APR. 29, 1916.
1,199,165.
Patented Sept. 26, 1916.
2 SHEETS—SHEET 2.
Fig. 2.
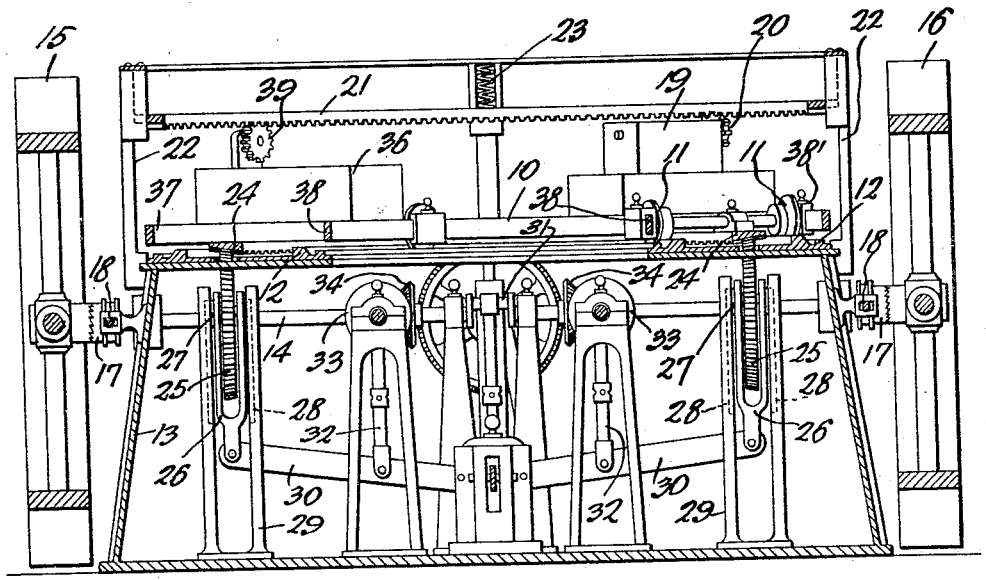
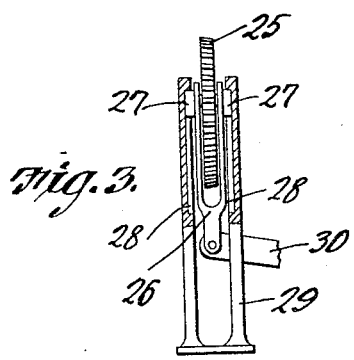
Fig. 3.
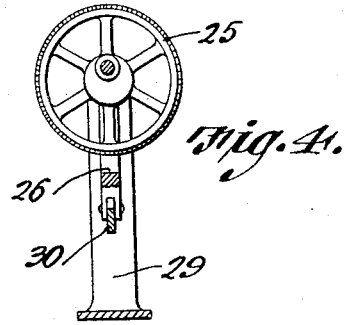
Fig. 4.
Witnesses
Salvador Dominguez Inventor
by C. A. Snow & Co.
Attorneys

UNITED STATES PATENT OFFICE.

SALVADOR DOMINGUEZ, OF SAN ANTONIO, TEXAS.

POWER-MULTIPLYING MECHANISM.

1,199,165.  Specification of Letters Patent.  Patented Sept. 26, 1916.

Application filed April 29, 1916. Serial No. 94,433.

*To all whom it may concern:*

Be it known that I, SALVADOR DOMINGUEZ, a citizen of Mexico, residing at San Antonio, in the county of Bexar and State of Texas, have invented a new and useful Power-Multiplying Mechanism, of which the following is a specification.

The object of the invention is to provide a power multiplying mechanism of simple construction wherein lost motion is eliminated and the maximum effect of kinetic energy is utilized to overcome the effect of variations of load, while securing an economy of original or prime power.

Further objects of the invention will appear in the following description, it being understood that changes in the form, proportions and details of construction of the machine may be made within the scope of the appended claims, without departing from the spirit of the invention.

In the drawings wherein one embodiment of the invention is disclosed, Figure 1 is a plan view. Fig. 2 is a vertical section on the line 2—2 of Fig. 1. Fig. 3 is a detail sectional view showing one of the reciprocatory members in its mountings and carrying the corresponding eccentric member. Fig. 4 is an elevation of the structure illustrated in Fig. 3.

The machine consists essentially of a motor actuated by one or more prime movers, and serving through the rotary motion and weight of a continuously revoluble element thereof, to actuate reciprocatory members carrying other revoluble elements respectively mounted eccentrically upon said reciprocatory members and peripherally traversing a tread on the main rotary member, the motion of said reciprocatory members being communicated through suitable connections to the driven member or shaft of the device from which power may be withdrawn for the work to be performed.

As illustrated, the rotary member 10 of the motor is provided with suitable guiding and supporting rollers 11 which traverse tracks 12, which may be suitably supported by any substantial base 13 in which is mounted the driven member or shaft 14. This shaft is provided with fly wheels 15 and 16, either or both of which may be coupled to the driven shaft by means of suitable clutches 17 adapted to be actuated by levers 18.

The rotary member of the motor is adapted to be actuated by one or more prime movers, of which two are illustrated in the drawings mounted at diametrically opposite points above and upon said rotary member of the motor as shown at 19. If desired other prime movers may be employed to increase the initial power of the machine, but by arranging two as illustrated at diametrically opposite points, it is possible to take advantage of the coupled power and thus avoid unnecessary friction or other resistance. The gears 20 of these prime movers are arranged to mesh with the teeth of a driving rack 21, preferably yieldingly supported in a frame 22, and normally held against upward movement by resistance devices such as springs 23, which serve to depress said rack and therefore the rotary member of the motor in the event that the latter should be elevated more or less by a sudden and unusual increase of resistance.

Carried by the rotary member of the motor is a tread 24 which in this instance consists of a rack with which mesh revoluble elements or gears 25 which are eccentrically mounted within reciprocatory members 26, mounted for movement in a path at an angle to the plane of movement of the rotary member of the motor and preferably perpendicular thereto, said reciprocatory or vibratory members having lateral guiding webs 27 which operate in grooves 28 in the guiding uprights 29, suitably supported by the base or otherwise.

During the movement of the rotary member of the motor, motion is imparted to the revoluble elements 25 which in turn impart vibratory movement to the reciprocatory members 26, and this motion of the reciprocatory members is suitably communicated to the driven member or shaft 14, in the construction illustrated by means of levers 30 to the outer extremities of which the reciprocatory members are connected, and crank shafts 31 which are connected with intermediate portions of said levers 30 by means of pitmen 32 which may be provided with any suitable means for adjustment as to length to secure the desired result. The crank shafts are connected for coöperative movement and transmission of power by means of intermeshing bevel gears 33 and gears 34 which are secured to said driven shafts. Also in order to give desired weight to the rotary member of the motor in order to increase its effect in imparting motion to the revoluble element 25 and resist vertical displacement, weights 35 arranged in suitable weight boxes 36 may be employed.

An efficient construction of frame for the rotary member of the motor is illustrated in the drawings and consists of the outer or peripheral circular bar 37 to which the bearing boxes 38' of the spindles of the bearing rollers 11 are attached, and an inner circular bar 38 which in turn carries the inner bearing boxes of said bearing rolls. Also in order to insure a desirable regularity of movement of the rotary member, additional or idle guiding gears 39 at diametrically opposite points on the quarter-circle from the prime mover may be used.

From the above description it will be noted that in the event of sudden and unusual resistance to the depression of the reciprocatory members, causing a corresponding resistance to the rotation and depression of the revoluble elements 25, there will be a tendency for the rotary member of the motor to be elevated, but this tendency will be resisted by the rack 21 through its depressing resistant element 23, whereby a substantially uniform transmission of power will be insured.

What is claimed is:—

1. A power multiplying mechanism having a motor embodying a rotary member, a prime mover for actuating the same, a vibratory member for operation in a path at an angle to the plane of said rotary member, and a revoluble element eccentrically mounted upon said vibratory member and peripherally engaged by a tread on the rotary member, a driving member, and means for communicating motion from the vibratory member to the driven member.

2. A power multiplying mechanism having a motor embodying a rotary member, a prime mover carried by said rotary member and coöperating with a fixed element to actuate said rotary member, a vibratory member for operation in a path at an angle to the plane of said rotary member, and a revoluble element eccentrically mounted upon said vibratory member and peripherally engaged by a tread on the rotary member, a driven member, and means for communicating motion from the vibratory member to the driven member.

3. A power multiplying mechanism having a motor embodying a rotary member, a circular rack parallel with the path of said rotary member, prime movers arranged in couple on and carried by the rotary member and provided with gears meshing with said rack, a vibratory member for operation in a path at an angle to the plane of said rotary member, and a rotary element eccentrically mounted upon said vibratory member and peripherally engaged by a tread on the rotary member, a driven member, and means for communicating motion from the vibratory member to the driven member.

4. A power multiplying mechanism including a motor having a rotary member mounted upon suitable guides, prime movers arranged in couple on and carried by the rotary member, a rack for engagement by gears driven by said prime movers, said rack being adjusted for yielding movement in a path axially of the rotary member, resistance devices for said rack to hold same in its normal condition, a vibratory member for operation in a path at an angle to the plane of said rotary member, and a revoluble element eccentrically mounted upon said vibratory member and peripherally engaged by a tread on the rotary member, a driven member, and means for communicating motion from the vibratory member to the driven member.

5. A power multiplying mechanism having a motor embodying a rotary member, a prime mover for actuating the same, a reciprocatory member mounted for movement in a path at a substantial right angle to the plane of said rotary member, and a revoluble element eccentrically mounted upon said reciprocatory member, said element having peripheral gear teeth, a rack carried by said rotary member for engagement with said gear teeth to impart motion to the revoluble element, a driven member, and means for communicating motion from the reciprocatory member to the driven member.

6. A power multiplying mechanism having a motor embodying a rotary member, a prime mover for actuating the same, a vibratory member for operation in a path at an angle to the plane of said rotary member, and a revoluble element eccentrically mounted upon said vibratory member and peripherally engaged by a tread on the rotary member, a driven member, and connections between said vibratory member and the driven member, the same including a lever with which said vibratory member is connected, a crank shaft geared to the driven member, and a pitman connecting an intermediate portion of said lever with the crank shaft.

In testimony that I claim the foregoing as my own, I have hereto affixed my signature in the presence of two witnesses.

SALVADOR DOMINGUEZ.

Witnesses:
IVY E. SIMPSON,
PHILOMENA A. ROCKELLI.

Copies of this patent may be obtained for five cents each, by addressing the "Commissioner of Patents, Washington, D. C."